United States Patent
Bystrov et al.

(10) Patent No.: US 9,715,754 B2
(45) Date of Patent: Jul. 25, 2017

(54) IN-PLANE AND INTERACTIVE SURFACE MESH ADAPTATION

(75) Inventors: Daniel Bystrov, Hamburg (DE); Nicole Schadewaldt, Norderstedt (DE); Heinrich Schulz, Hamburg (DE); Torbjoern Vik, Hamburg (DE); Yogish Mallya, Bangalore (IN); Prashant Kumar, Bangalore (IN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 658 days.

(21) Appl. No.: 13/813,721

(22) PCT Filed: Aug. 1, 2011

(86) PCT No.: PCT/IB2011/053411
§ 371 (c)(1),
(2), (4) Date: Feb. 1, 2013

(87) PCT Pub. No.: WO2012/017375
PCT Pub. Date: Feb. 9, 2012

(65) Prior Publication Data
US 2013/0135305 A1 May 30, 2013

Related U.S. Application Data

(60) Provisional application No. 61/370,928, filed on Aug. 5, 2010.

(51) Int. Cl.
*G06T 17/00* (2006.01)
*G06T 15/00* (2011.01)
(Continued)

(52) U.S. Cl.
CPC .............. *G06T 15/00* (2013.01); *G06T 7/10* (2017.01); *G06T 7/11* (2017.01); *G06T 7/149* (2017.01);
(Continued)

(58) Field of Classification Search
CPC .... G06T 7/0083; G06T 7/0089; G06T 7/0012
(Continued)

(56) References Cited

U.S. PATENT DOCUMENTS 6,106,466 A    8/2000   Sheehan et al.
6,385,332 B1   5/2002   Zahalka et al.
(Continued)

OTHER PUBLICATIONS

Collins, D. L., et al.; Model-based segmentation of individual brain structures from MRI data; 1992; Proc. SPIE; 1808, Visualization in Biomedical Computing; 10-23.
(Continued)

*Primary Examiner* — Peter Hoang

(57) ABSTRACT

Interactive mesh deformation for in-plane 3D segmentation/delineation for radiation therapy planning done on a slice by slice basis of a region/a volume of interest (VOI, ROI). Segmentation starts by some automatic 3D algorithm approximating the organ surface roughly by some triangular surface mesh which mesh is afterwards manually refined by the user who deforms it to bring it closer to the region of interest. The deformation is an invertible, i.e. one-to-one, mapping avoiding self-intersections of the deformed mesh thereby preserving the topology of the anatomy. The deformation mapping involves a Gaussian function (Gaussian deformation kernel) restricting the deformation to a local region. The user picks with the pointer a start point on a selected image slice through the volume and moves it to some end point. The distance the mesh vertices move decreases exponentially with the distance to the start point. Additionally, surface mesh resolution is increased by iteratively subdividing mesh triangles in the vicinity of a user-selected contour in a surface mesh until every pixel or voxel contains at least one triangle vertex.

7 Claims, 14 Drawing Sheets

(51) Int. Cl.
  *G06T 19/20* (2011.01)
  *G06T 7/10* (2017.01)
  *G06T 7/11* (2017.01)
  *G06T 7/149* (2017.01)

(52) U.S. Cl.
  CPC .... *G06T 19/20* (2013.01); *G06T 2207/10072* (2013.01); *G06T 2210/41* (2013.01); *G06T 2219/2021* (2013.01)

(58) Field of Classification Search
  USPC .......................................................... 345/420
  See application file for complete search history.

(56) References Cited

U.S. PATENT DOCUMENTS

| | | |
|---|---|---|
| 7,167,172 B2 | 1/2007 | Kaus et al. |
| 7,440,609 B2 | 10/2008 | Von Berg et al. |
| 7,536,041 B2 | 5/2009 | Pekar et al. |
| 2005/0238233 A1* | 10/2005 | Mulet Parada et al. ...... 382/199 |

OTHER PUBLICATIONS

Date, H., et al.; Triangular Mesh Deformation based on Dimensions; 2008; Computer-Aided Design and Applications; 5(1-4)287-295.

Erdt, M., et al.; Smart manual landmarking of organs; 2010; Proc. of SPIE; 7623, Medical Imaging; pp. 1-9.

Kass, M., et al.; Snakes: Active Contour Models; 1998; Intl. Journal of Computer Vision; 1:321-331.

Kaus, M. R., et al.; Automated 3-D PDM Construction from Segmented Images Using Deformable Models; 2003; IEEE TMI; 22(8)1005-1013.

Kumar, P., et al.; Mesh based ROI correction interface for organ delineation in radiation oncology planning; 2010; IEEE Trans. on Signal Processing and its Applications; pp. 1-5.

Lorenz, C., et al.; 3D Statistical Shape Models for Medical Image Segmentation; 1999; 2nd Intl. Conf. on 3-D Imaging and Modeling (3DIM'99); pp. 0414.

Mallya, Y., et al.; Shape Constrained Mesh Editing for Delineating Anatomical Structures in Volumetric Datasets; 2010; IEEE Int. Advance Computing Conference (IACC'10)97-100.

Park, J.-Y., et al.; A non-self-intersecting adaptive deformable surface for complex boundary extraction from volumetric images; 2001; Computers & Graphics; 421-440.

Pekar, V., et al.; Automated Model-Based Organ Delineation for Radiotherapy Planning in Prostatic Region; 2004; Intl. Journal of Radiation Oncology Biology Physics; 60(3)973-980.

Schwarz, T., et al.; Interactive Surface Correction for 3D Shape Based Segmentation; 2008; Proc. SPIE—The Intl. Soc. for Optical Engineering; 6914:1-8.

Sumner, R. W., et al.; Deformation Transfer for Triangle Meshes; 2004; SIGGRAPH; 1-7.

Timinger, H., et al.; Integration of Interactive Corrections to Model-Based Segmentation Algorithms; 2003; Bildverarbeitung fur die Medizin, Springer, DE; pp. 171-175.

\* cited by examiner

Triangle to be subdivided (for line editing)

Adjacent triangle (subdivide to achieve true triangular mesh)

Case I

Case II

Case III

Case IV

IN-PLANE AND INTERACTIVE SURFACE MESH ADAPTATION

CROSS REFERENCE TO RELATED APPLICATIONS,

This application is a national filing of PCT application Serial. No. PCT/IB2011/053411, filed Aug. 1, 2011, published as WO 2012/017375A2 on Feb. 9, 2012, which claims the benefit of U.S. provisional application Ser. No. 61/370,928 filed Aug. 5, 2010, which is incorporated herein by reference.

DESCRIPTION

The present application finds particular utility in medical imaging systems. However, it will be appreciated that the described technique(s) may also find application in other types of imaging systems, therapy planning systems, and/or other diagnostic or segmentation applications.

In radiotherapy, target regions and organs at risk are delineated in CT or MR datasets. Such segmentations are typically represented by closed meshes, binary images or contour stacks. Tools for interactive segmentation as well as automated methods for delineation are used. However, often manually correcting generated segmentations are required.

For radiotherapy planning, interactive techniques for manipulating surface delineations are often used. One technique for locally deforming a surface described as a mesh includes transforming the nodes of the mesh using a virtual tool with a surface shape defined by a Gaussian function. This technique is parameterized by a scaling or radius parameter. Although the scaling parameter is adjustable, the scaling or radius parameter is kept fixed during the interaction. The resulting deformation is not invertible and the resulting mesh may be distorted or self-intersect.

The technique for deforming segmentations interactively uses a spatial transformation T that employs a Gaussian function in dependence of the start point $p_s$ and end point $p_e$ of a mouse interaction, such that:

$$T: R^d \rightarrow R^d; \text{ and}$$

$$T(p) := p + \exp(-(p-p_s)^2/r^2)(p_e-p_s);$$

with the spatial dimension d=3 (or d=2 for 2D segmentations). The parameter r specifies the local and global influence of the transformation. Typically this parameter can be manually adjusted in the user interface. If the radius r is fixed or set to a certain value in the user interface, the resulting deformation will not be invertible if the distance of start- and end-point exceeds a certain value. In such cases, artificial effects occur including collisions of boundaries or "self-overlapping" segmentations, which lead to a non-intuitive and badly controllable user interaction.

Additionally, 3D polygonal, often triangular, surface mesh representation of anatomical structure is employed in many medical applications, such as shape representation, model based segmentation, volume visualization, etc. However, fine in-plane editing of 3D triangular surface mesh for user interaction and correction is a complex problem. It becomes even more challenging when mesh resolution is limited, which indeed is the case as an increase in mesh resolution increases computational burden and diminishes the possibility of executing the application in real time.

Organ delineation from volumetric images is an integral part of radiation oncology planning. The aim is to maximize the radiation dose to the tumor volume while minimizing the radiation exposure to the healthy tissue of surrounding organs. In order to do so, the radiotherapy planning clinician needs to spend several hours contouring/delineating (manually on 2D image slices using simple drawing tools on the computer) the tumor volume and risk organs in the volumetric image set. The burden of manual organ delineation has further increased with advancements towards intensity modulated and 4-D adaptive planning, which compensate for daily changes in the patient anatomy. Therefore, the development of robust and fast automated segmentation/contouring techniques has been the focus point for the success of radiotherapy planning.

Automated segmentation of volumetric image sets in radiotherapy planning is a challenging problem. In particular, the boundary between different soft-tissue organs might be very difficult to detect even by a trained human observer due to poor soft-tissue contrast on CT scans. Also, the organ shape can be highly variable. It has been well established that the segmentation of such difficult cases cannot be done based on the image content alone (See, e.g., Kass M, Witkin A, Terzopoulos D. Snakes: Active contour models. Int J Comp Vis 1988; 1:321-331. See also Collins D L, Peters T M, Dai W, et al. Model-based segmentation of individual brain structures from MRI data. In: Robb R, editor. Visualization in Biomedical Computing (VBC'92). Vol. 1808, Chapel-Hill, N.C.: SPIE; 1992. p. 10-23). Prior information about the region of interest (ROI)/organ e.g. shape intensity range, gradient magnitude and direction etc. is extremely helpful to achieve accurate segmentation.

Model based segmentation captures such prior information about the ROI and is successfully applied to organ delineation in radiotherapy planning Model based segmentation technique use polygonal surface mesh as deformable organ models, derived from a population of volumetric medical datasets, to model an organ's/ROI's shape. These models are initialized either manually or automatically to position the surface mesh roughly over the region of interest in the target image data. After initializing, the surface mesh model is automatically adapted to fit to the anatomical boundary of the ROI (See, e.g., V. Pekar, T R McNutt, M R Kaus, "Automated model-based organ delineation for radiotherapy planning in prostatic region", International Journal of Radiation Oncology Biology Physics. 60(3), 973-980, 2004). These deformable organ models are mostly represented as 3D triangular surface meshes. The advantages of triangular mesh representation are that prior knowledge could be easily incorporated using statistical point distribution models (PDMS), 3D visualization (rendering) of triangular meshes could be done very efficiently by surface rendering methods using standard graphics hardware, and, in follow-up studies, it could automatically provide boundary mapping between organ surfaces, which can be useful for image registration in adaptive radiotherapy (See, e.g., C. Lorenz, N. Krahnstover, "3D Statistical Shape Models for Medical Image Segmentation," 3dim, pp. 0414, Second International Conference on 3-D Imaging and Modeling (3DIM '99), 1999. See also M R Kaus, V. Pekar, C. Lorenz, R. Truyen, S. Lobregt and J. Weese, "Automated 3-D PDM construction from segmented images using deformable models", IEEE TMI, 22(8), 1005-1013, 2003).

Model based segmentation techniques have greatly helped the cause of organ delineation in radiotherapy planning by reducing the manual effort. These techniques are fairly accurate; however, the result of automatic segmentation might not always be correct. Automatic segmentation could be inaccurate due to attraction to false boundaries, which can happen because of poor model initialization or weak image feature response at correct locations. Also, if the surface of the ROI is not well-defined in the volumetric datasets, the fitted mesh may be inaccurate or uncertain. To be acceptable in clinical practice, it is crucial for a segmentation approach to integrate corrective input from the user. It calls for 3D mesh editing techniques which can deform the surface mesh to produce the user desired segmentation result i.e. the ROI boundary marked by the user (See, e.g., Yogish Mallya, Prashant Kumar, "Shape Constrained Mesh Editing For Delineating Anatomical Structures in Volumetric Datasets" IEEE International Advance Computing Conference (IACC'10), 2010).

Though the underlying representation of the ROI is a 3-D triangular surface mesh, the user is mostly interested in the ROI contours representing the ROI boundary on a given image slice (as the clinical user evaluates the volumetric image set on a slice by slice basis e.g. axial, coronal or sagital slice view). These ROI contours are obtained by solving the line-plane equation between the viewed image plane and the edges of triangular mesh cells which intersect with the image plane. If the automatic segmentation result is incorrect, a subset of mesh vertices (control points) are to be deformed in such a fashion so that the new ROI boundary resulting on the viewed image plane matched with the user desired correction.

The resolution of mesh, i.e. the number of mesh vertices and the size of triangular mesh cells (edges of triangles), is very low when compared to the image resolution of CT images, in order to ensure good real time performance of model-based segmentation and rendering techniques. The low resolution of surface mesh limits the fine in-plane editing capability as the triangular cell edges span over more than one image plane. This poses an interesting challenge to mesh editing techniques that aim to achieve fine editing capability only in the viewed image plane (like editing of binary masks), i.e. the deformation of mesh vertices should so happen that the ROI boundary on the viewed image plane is corrected but the ROI boundary on the adjacent image planes remains intact. Displacement of a vertex in the low resolution mesh has a 3-D editing effect, since the ROI contours on the adjacent image slices get modified due displacement of the common triangular edges intersecting with these multiple image planes. The use of a very high resolution surface mesh model is not a practically feasible solution as the time and accuracy performance hit will be unacceptable.

ROI representation based on triangular surface mesh models is very useful in a variety of 3-D medical applications. For example, Pinnacle, a Philips radiation oncology product suite for radiation therapy planning, uses 3-D triangular surface mesh-based organ models to represent anatomical structures. It provides a way for automatic segmentation of complex anatomical structures, and these surface mesh models can be conveniently propagated to new consecutive image sets of the patient during the course of treatment (using image registration techniques), thus reducing the burden of manual contouring. However, achieving in-plane 2-D editing experience with limited resolution surface mesh models is a complex problem and it limits their usability for in plane editing use cases. When dealing with critical anatomical structures, e.g. brain stem, cord, etc., the clinical user requires a precise in-plane editing control for accurate segmentation. Though the low resolution mesh based ROI representation is advantageous in many ways (computationally efficient, suited for good performance of automatic model based segmentation, fast rendering etc.), it limits the fine tuning (in-plane 2D editing) ability which is crucial in critical cases.

There is an unmet need in the art for systems and methods that overcome the deficiencies noted above.

In accordance with one aspect, a method of invertibly deforming a diagnostic image segmentation mesh by automatically adjusting a radius of curvature of a deformation kernel includes receiving user input regarding a start point $p_s$ for a contour to be deformed on a surface mesh overlaid on a diagnostic image, and adjusting a curvature of deformation to a distance between the start point $p_s$ and an end point $p_e$, such that the curvature of deformation is adjusted in accordance with the distance between the start point $p_s$ and the end point $p_e$.

In accordance with another aspect, a system that facilitates invertibly deforming a diagnostic image segmentation mesh by automatically adjusting a radius of curvature of a deformation kernel includes a display on which is presented to a user a diagnostic image with a segmentation surface mesh overlaid thereon, and a user input device via which a user inputs a start point $p_s$ for a contour on the surface mesh to be deformed. The system further includes a processor (308) that adjusts a curvature of deformation to a distance between the start point $p_s$ and an end point $p_e$, such that the curvature of deformation of the contour is adjusted in accordance with the distance between the start point $p_s$ and the end point $p_e$.

According to another aspect, a method of performing in-plane editing of a surface mesh overlaid on a region of interest in a diagnostic image includes receiving user input related to a selected contour on a surface mesh overlaid on a region of interest in a diagnostic image, identifying a subset of surface mesh triangles proximate to the selected contour, and defining the surface mesh to better conform to a portion of the diagnostic image. The method further includes iteratively subdividing the triangles in the identified subset in order to increase resolution of the surface mesh in a region of the selected contour, and executing a fuzzy line change (FLC) algorithm to edit the surface mesh once the resolution of the subset of surface mesh triangles is above a predetermined threshold.

According to another aspect, a system that facilitates in-plane editing of a surface mesh overlaid on a region of interest in a diagnostic image includes a user input device via which is selected a contour on a surface mesh overlaid on a region of interest in a diagnostic image presented to a user on a display, and a processor that identifies a subset of surface mesh triangles proximate to the selected contour. The processor additionally defines the surface mesh to better conform to a portion of the diagnostic image, iteratively subdivides the triangles in the identified subset in order to increase resolution of the surface mesh in a region of the selected contour, and executes a fuzzy line change (FLC) algorithm to edit the surface mesh once the resolution of the subset of surface mesh triangles is above a predetermined threshold.

According to another aspect, a method of editing a surface mesh comprises overlaying a surface mesh on a region of a diagnostic image, deforming the surface mesh to better conform to a region of the diagnostic image. Deforming the surface mesh includes at least one of deforming a section of the surface mesh by displacing the section with a virtual tool where curvature of deformation changes with an amount of displacement, and subdividing a section of the surface mesh to improve a resolution with which the section of the surface mesh conforms to the region of the diagnostic image.

One advantage is that surface mesh contour deformation is invertible.

Another advantage is that surface mesh resolution is increased.

Still further advantages of the subject innovation will be appreciated by those of ordinary skill in the art upon reading and understand the following detailed description.

The innovation may take form in various components and arrangements of components, and in various steps and arrangements of steps. The drawings are only for purposes of illustrating various aspects and are not to be construed as limiting the invention.

FIG. 5A illustrates the segmentation/contouring results for a 2-D image slice view. A region of interest (ROI) mesh is shown with a viewed image plane passing there through.

Figure 10C:
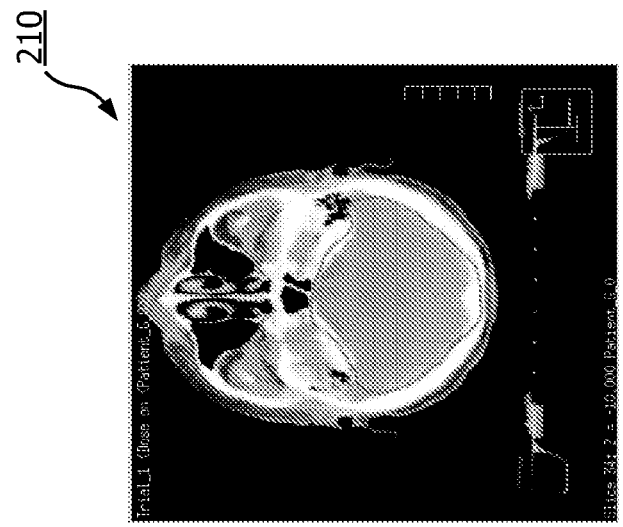
Figure 10B:
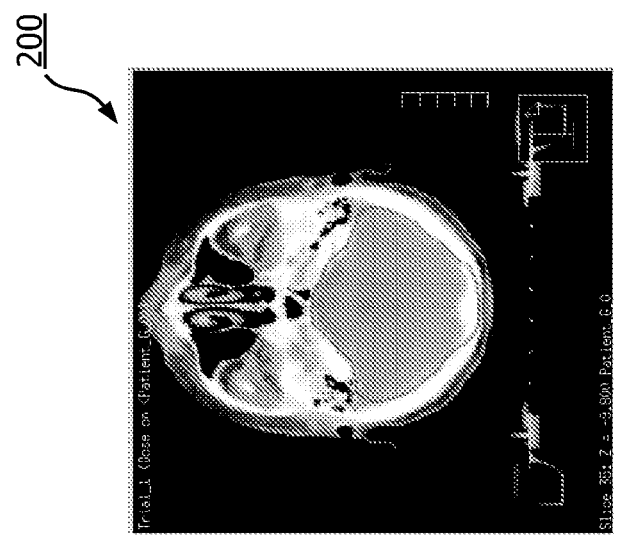
Figure 10A:
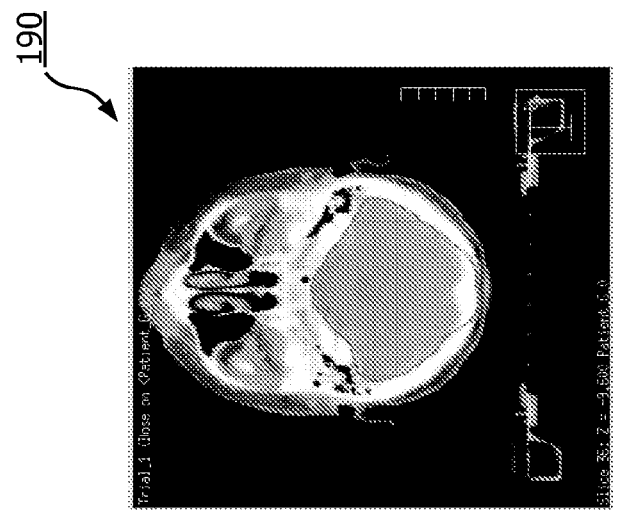

FIGS. 10A-10C respectively show the three post-editing slices N−1, N, and N+1 after editing of the image slice N using a mesh editing technique.

Figure 11A:
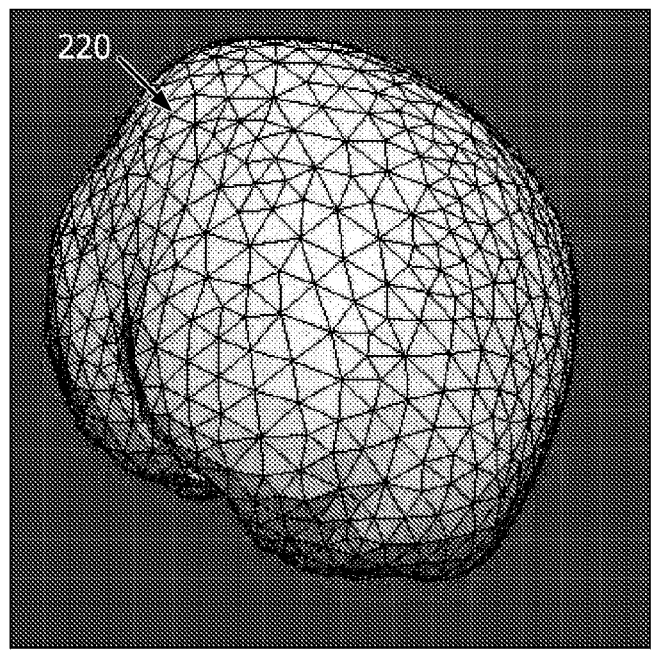
Figure 11B:
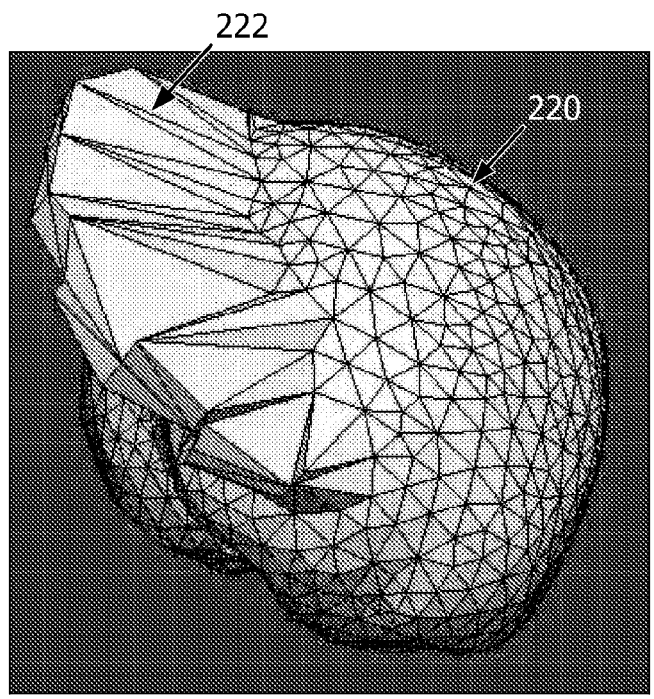

FIGS. 11A and 11B illustrate an example of an edited mesh, wherein the deformation of mesh vertices results in long triangular edges which modify the shape of ROI contour on the adjacent image planes.

Figure 12:
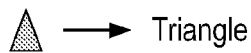
Figure 12:
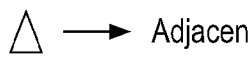
Figure 12:
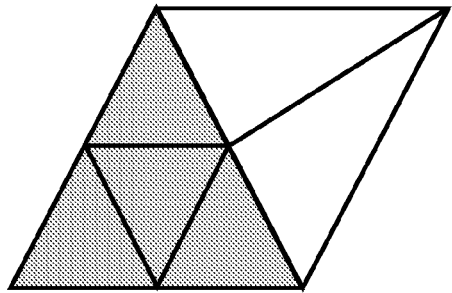
Figure 12:
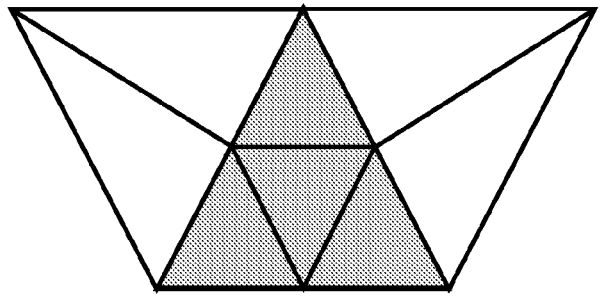
Figure 12:
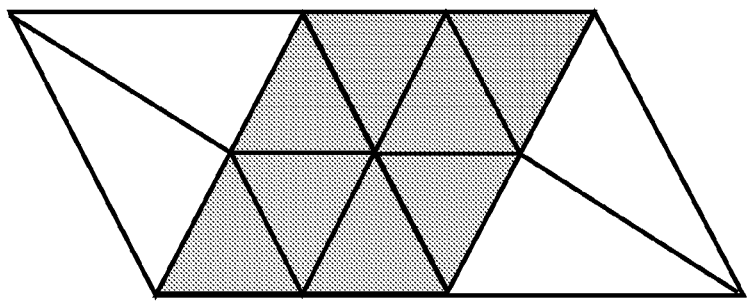
Figure 12:
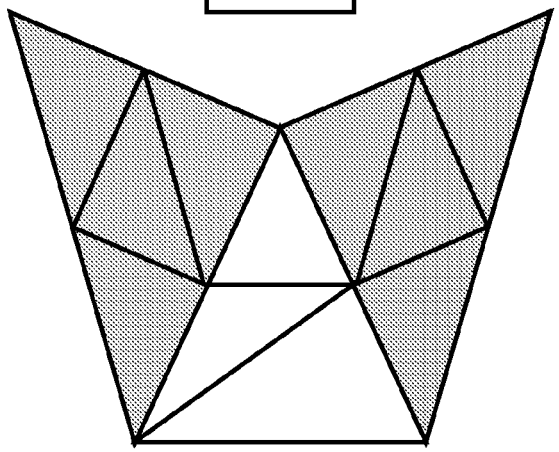

FIG. 12 illustrates several scenarios in which mesh triangles are subdivided.

Figure 13:
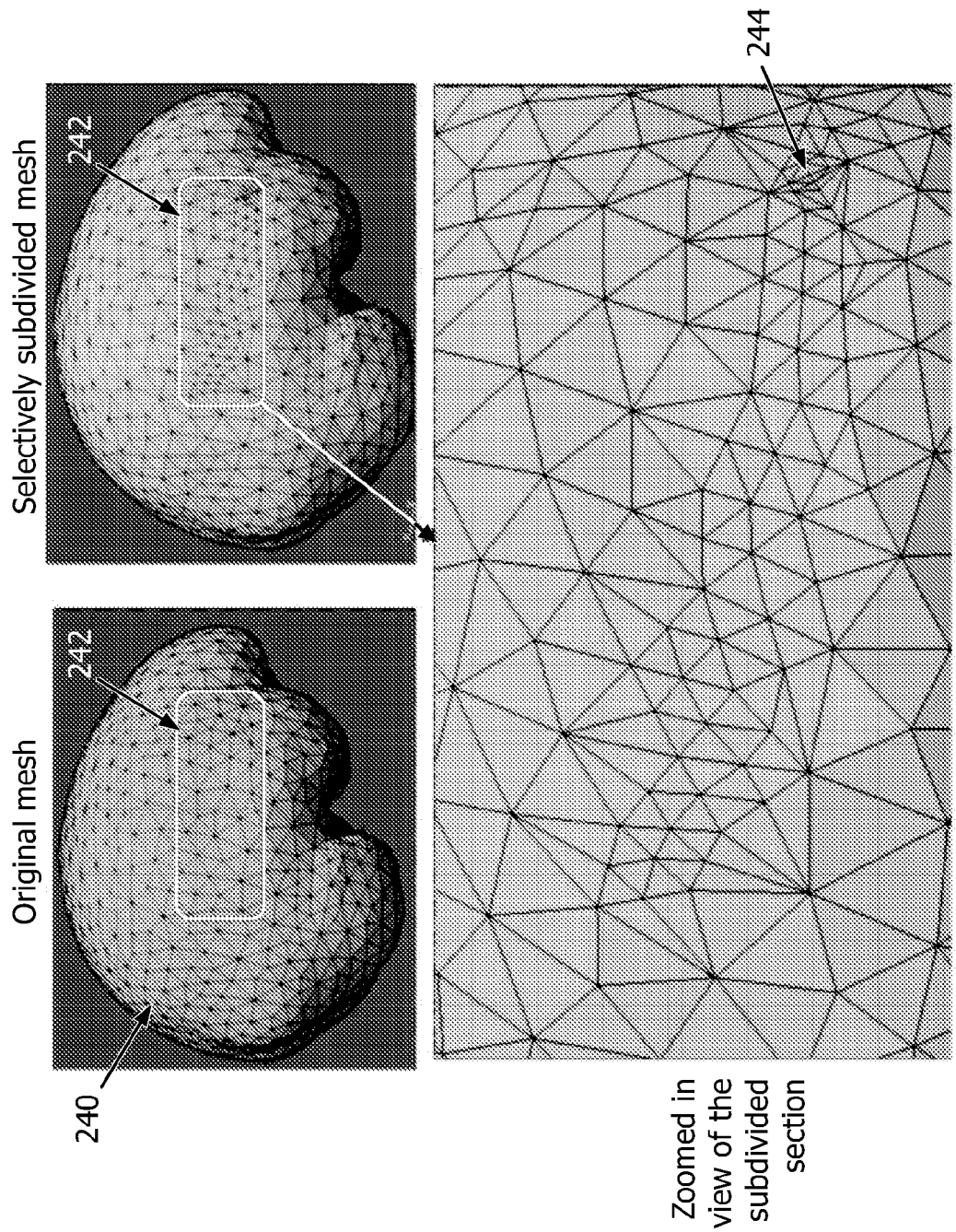

FIG. 13 shows the result of selective subdivision for a subset of triangular mesh cells.

Figure 14A:
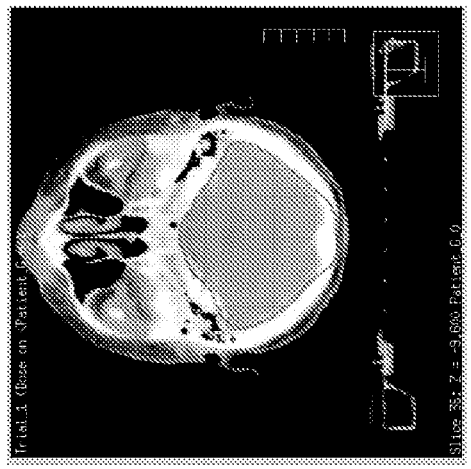
Figure 14B:
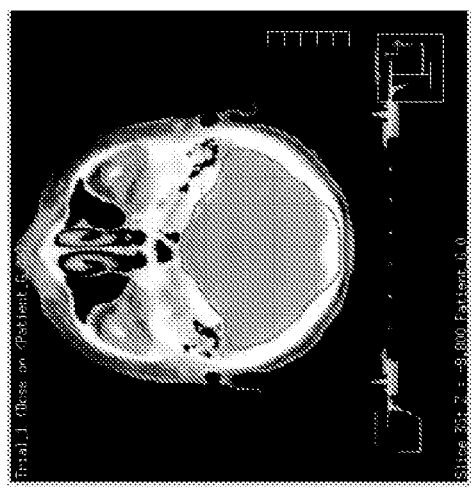
Figure 14C:
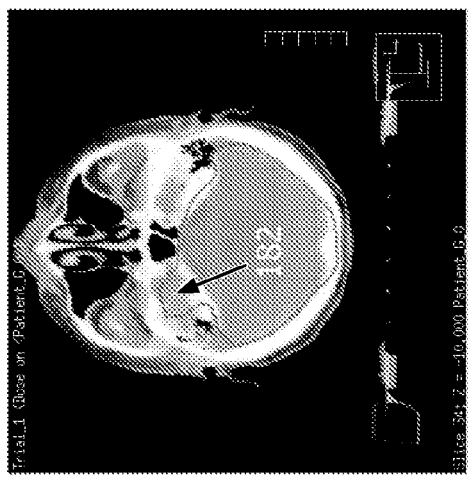

FIG. 14A-14C respectively show frames N−1, N, and N+1 after editing using the herein-described in-plane mesh editing technique, in which selected mesh triangles are subdivided while neighboring or adjacent mesh triangles are left unaffected.

Figure 15:
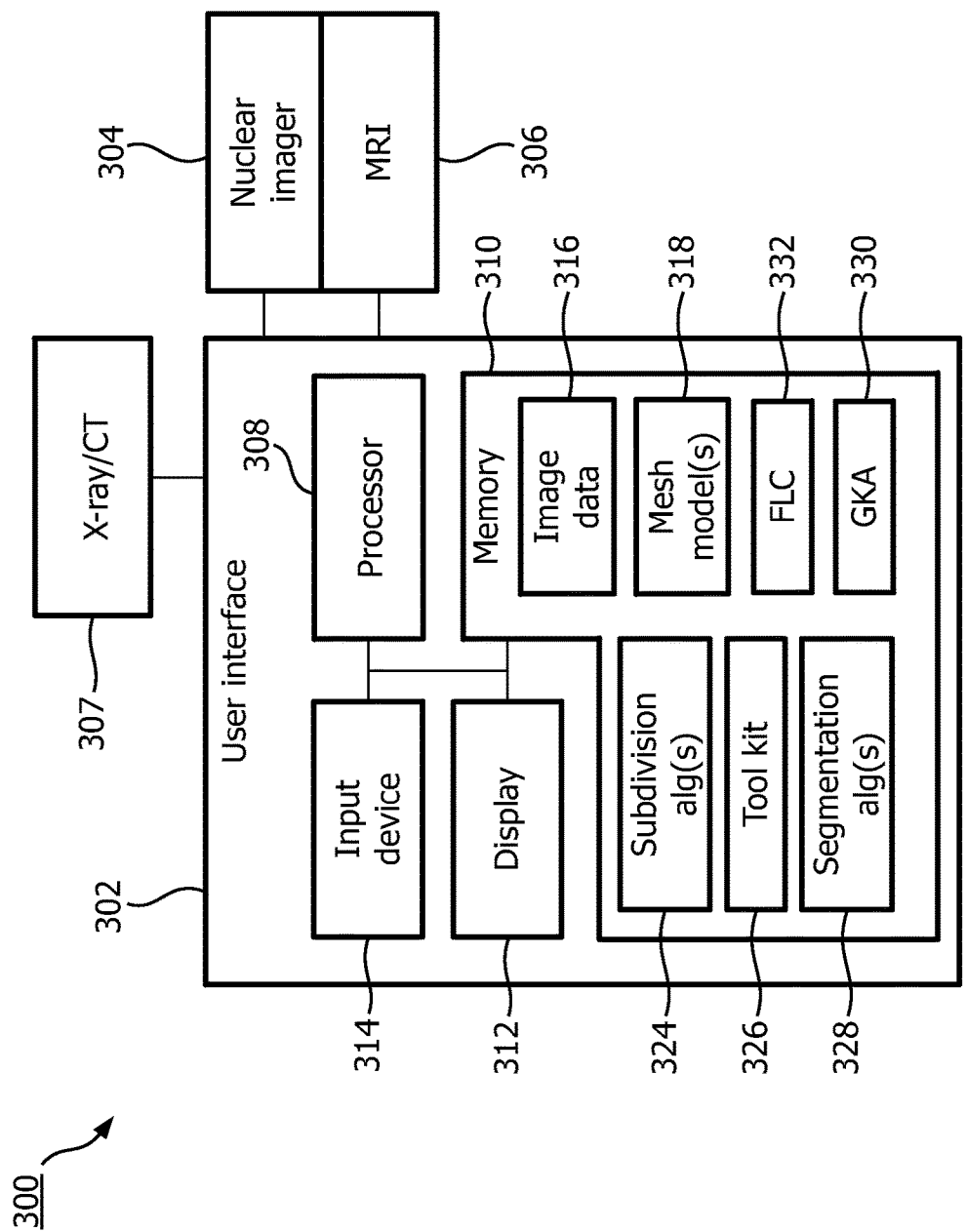

FIG. 15 illustrates a system that facilitates reversibly and deformation of a 3D surface mesh as well as surface mesh triangle subdivision that increases mesh resolution, in accordance with various aspects described herein.

Figure 16:
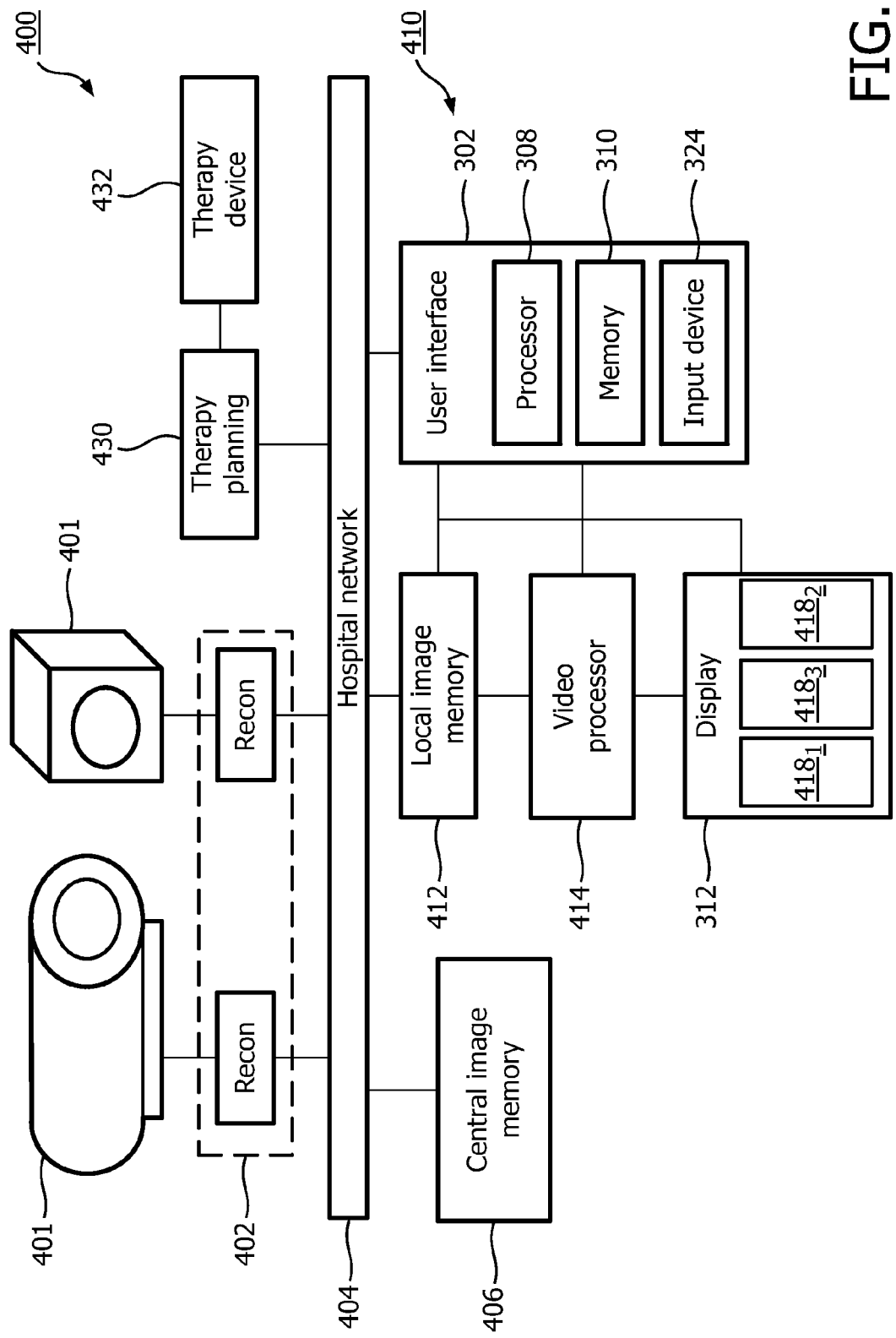

FIG. 16 illustrates an exemplary hospital system that may include a plurality of imaging devices, such as CT, MRI, PET, SPECT, variants of the foregoing, or the like, which generate imaging data that are reconstructed by individual or shared reconstruction processors to generate 3D image representations.

To overcome the aforementioned problems, a technique is described for automatically adjusting a scaling parameter of a segmentation tool in dependency on the distance between start- and end-points of a user-selected line or curve, so that the resulting segmentation mesh deformations are invertible, thereby providing a more controllable and suggestive user interaction. Moreover, other aspects provide a user editing technique for a surface mesh, which employs an iterative selective subdivision approach to increase the mesh resolution locally and deforms the mesh to achieve user-desired editing. That is, the described systems and methods facilitate providing an in-plane editing experience (2D editing) such as by using binary masks with surface meshes. The user interface is simple and intuitive; the clinical user draws a free hand curve to mark the correct ROI boundary on the viewed image plane. A local mesh subdivision and deformation strategy is formulated to achieve in plane mesh editing.

Figure 1:
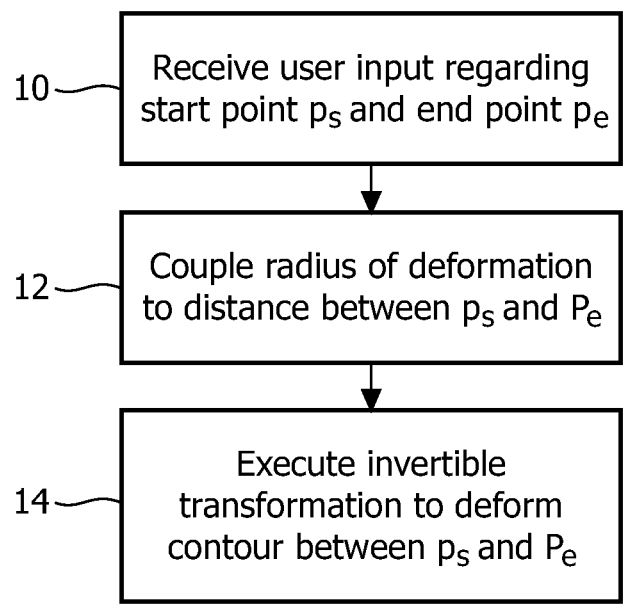
FIG. 1 illustrates a method for automatically adjusting the radius r of a transformation and for ensuring that the resulting transformation is invertible.

FIG. 1 illustrates a method for automatically adjusting the radius r of a transformation and for ensuring that the resulting transformation is invertible. For instance, a radius of a Gaussian kernel that is used to deform a mesh contour can be adjusted on the fly as a function of a magnitude of mouse (or other input device) movement by a user. According to the method, at 10, a user employs a user input device (e.g., a keyboard, mouse, stylus, etc.) to select a start point $p_s$ and an end point $p_e$ for a line or area to be deformed in a diagnostic image. The diagnostic image may be a computed tomography (CT) image, a magnetic resonance (MR) image, a nuclear image (e.g., a positron emission tomography (PET) image, a single photon emission computed tomography (SPECT) image, etc.). At 12, the radius r of deformation is coupled to the amount of mouse motion, i.e. the distance from $p_s$ to $p_e$. According to an example, a user clicks a mouse or stylus on (or otherwise selects) the start point $p_s$ for a line or contour to be deformed, drags a cursor a given distance, and then releases the mouse button at the end point $p_e$. In another embodiment, the user clicks on each of the start point and the end point and a line connecting the two points is automatically generated. The smaller the mouse motion (i.e., the smaller the distance between the start and end points), the more local the deformation.

At 14, the invertible transformation T is executed to deform the contour or region along the line between the start and end points. The transformation is invertible due to the correlation between the distance between the start and end points to the radius r of curvature of the deformation. In one embodiment, the transformation T is invertible when the radius r is larger than a given factor of the distance from $p_s$ to $p_e$, such that:

$$r=\lambda\|p_s-p_e\|,$$

where $$\lambda>\sqrt{2}\cdot\exp(-0.5)\approx0.86.$$

The endpoint need not be pre-assigned. Rather, the user can start moving the deformation tool from the start point and the radius r can continuously adjust with the movement of the tool.

Figure 2B:
FIGS. 2A-2D illustrate various views of an interactive segmentation application in which a fixed value λ=1.8 is employed.
Figure 2D:
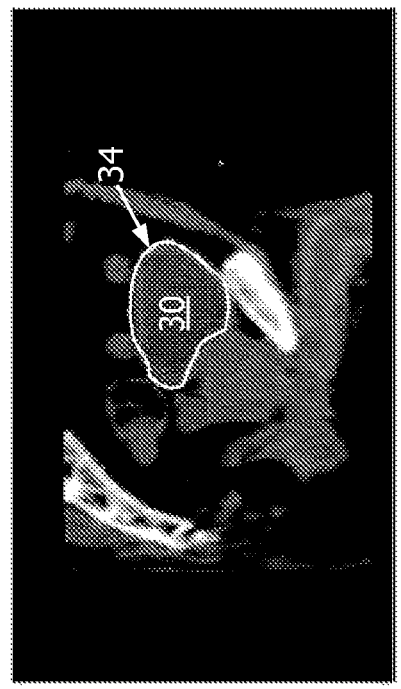
Figure 2A:
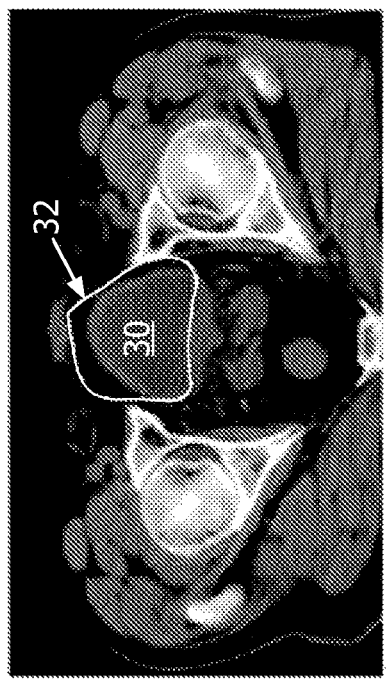

FIGS. 2A-2D illustrate various views of an interactive segmentation application in which a fixed value λ=1.8 is employed. In FIG. 2A, a bladder 30 is poorly segmented using a conventional technique in a top-down pelvic CT image. The segmentation 32 only loosely encompasses the bladder 30. In FIG. 2B, the segmentation 32 again is shown to loosely encompass the bladder 30 in a side-view pelvic CT image.

Figure 2C:
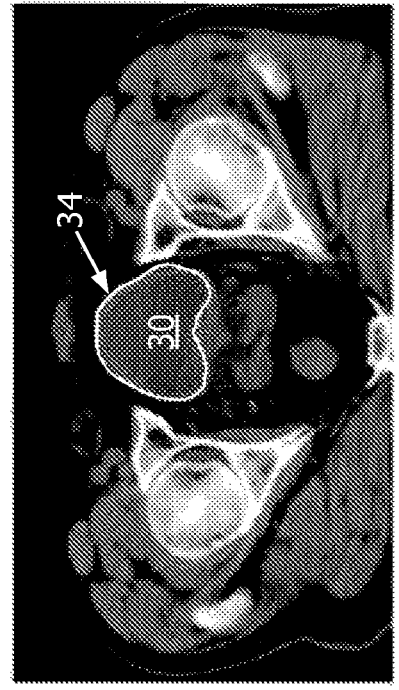

In contrast, FIG. 2C shows a tight segmentation 34 of the bladder 32 in the top-down pelvic CT image, such as is achieved using the described systems and methods. In FIG. 2D, the tight segmentation 34 is shown encompassing the bladder 30 in a side-view pelvic CT image. According to one embodiment, the tight segmentation is performed in 3-D and computed in less than approximately 60 seconds.

Figure 3A:
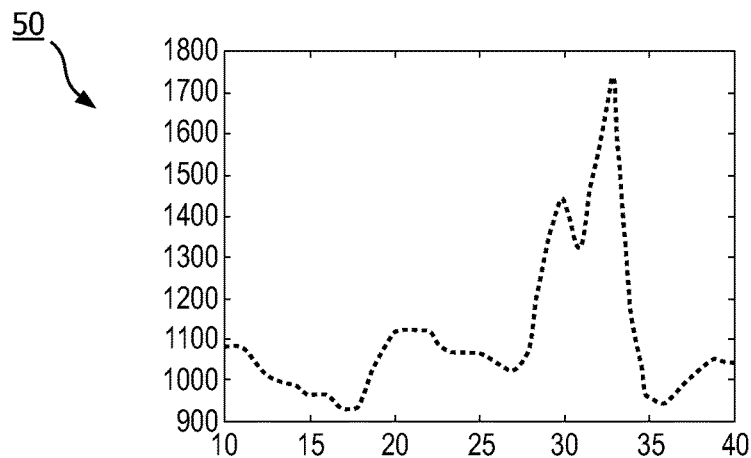
FIGS. 3A-3C show the results of transforming a 1D function with λ=0.4 and λ=1.8.
Figure 3B:
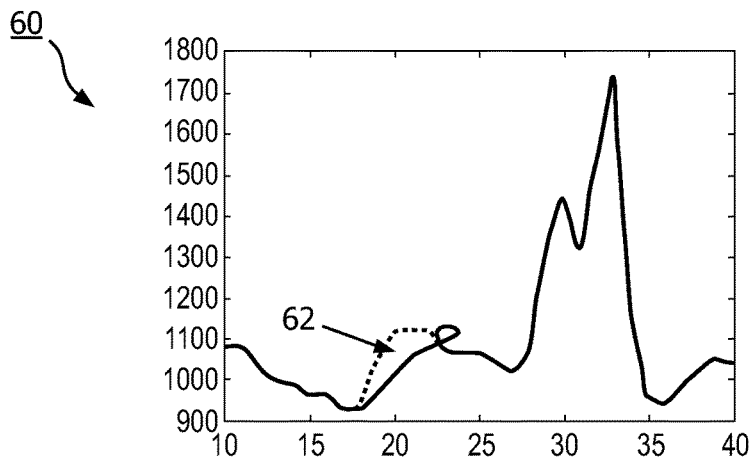
Figure 3C:
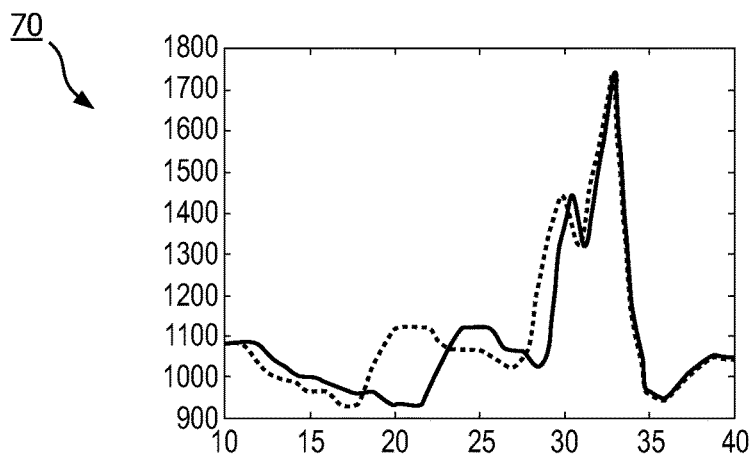

FIGS. 3A-3C show the results of transforming a 1D function with $\lambda=0.4$ and $\lambda=1.8$. In FIG. 3A, a 1-D example is shown for a deformation 50 of a function using a small fixed Gaussian kernel. FIG. 3B shows an example of a deformation 60 of the same function wherein $\lambda=0.4$, in which a corrupted and non-unique distribution 62 is present. FIG. 3C shows a deformation 70 of the same function, wherein $\lambda=1.8$. In FIGS. 3B and 3C, the kernel size is automatically adjusted so that the resulting transformation is invertible. It will be noted that the above-mentioned ratio X has a similar meaning as the CFL-number in computational fluid dynamics. For other radial basis functions the value for $\lambda$ may be different.

As an alternative to a fixed scalar ratio $\lambda$, the ratio also may be adapted to the current viewing resolution (zoom factor) or may be applied differently in different spatial directions depending on the current viewing direction.

It will be appreciated that the described systems and methods can be implemented in the context of radio therapy planning, where interactive contouring tools or interactive tools for manipulating automatic computed meshes are used. The described techniques are not dependent on the spatial dimension and may also be used for 2D-image manipulation.

Figure 4:
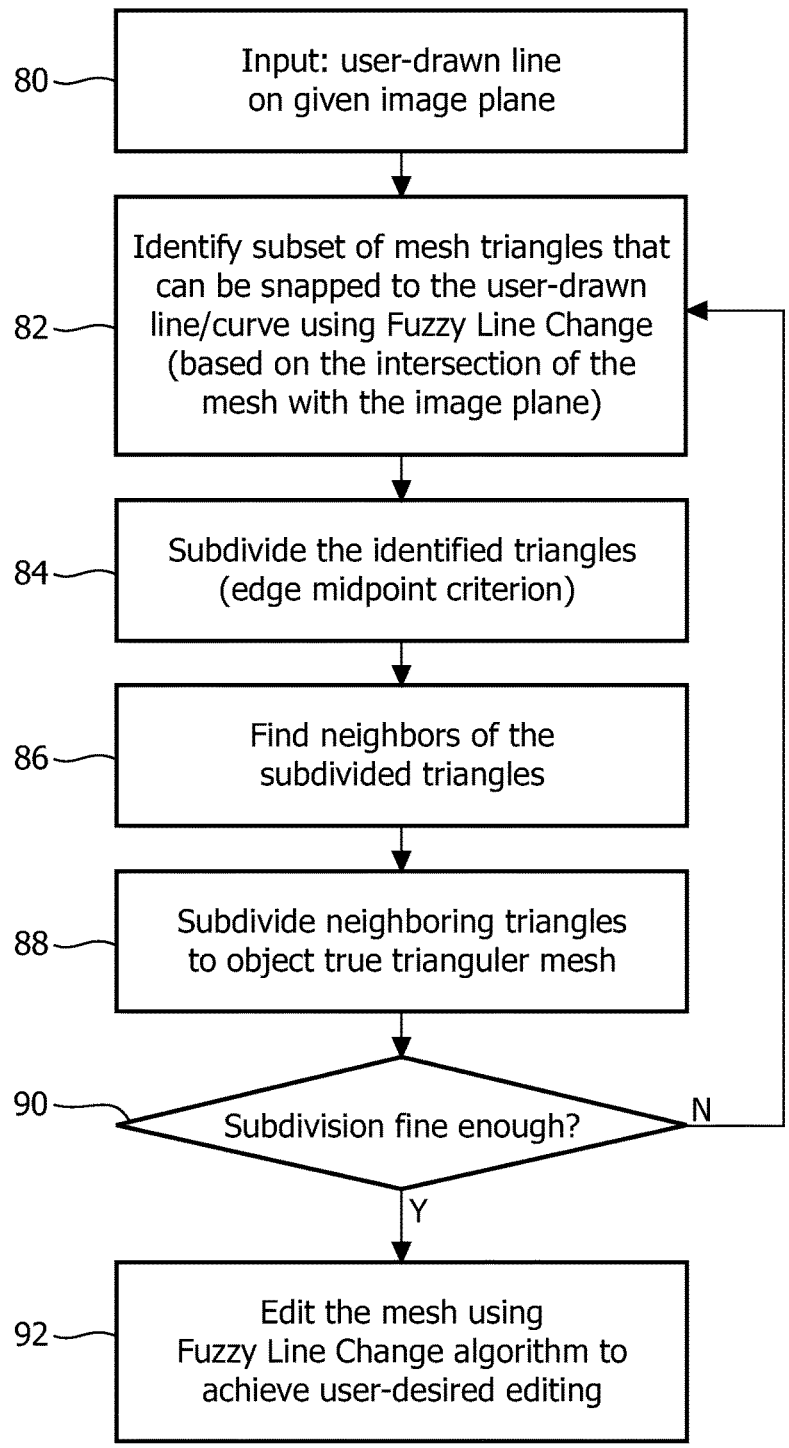
FIG. 4 illustrates a method that facilitates in-plane editing of a diagnostic image using an iterative and selective subdivision approach.

FIG. 4 illustrates a method that facilitates in-plane editing of a surface mesh overlaid on a region of interest in a diagnostic image using an iterative and selective subdivision approach. The method, which may be executed by a processor and stored as a set of computer-executable instructions on a computer-readable medium, provides an intuitive manual editing interface wherein the user draws a free hand curve or line on a viewed image plane (e.g., on a computer or workstation display) or manipulates the curve or surface with a precision virtual segmentation tool to mark the desired anatomical boundary of the ROI, at 80. At 82, a subset of triangular mesh vertices and cells are identified, which are to be deformed to achieve user desired editing. For instance, the identified vertices and cells are snapped to the user-drawn line or curve using a fuzzy line change (FLC) algorithm, described in greater detail with regard to FIG. 7. At 84, the identified triangles are subdivided using an edge midpoint criterion. For example, a local subdivision strategy may be executed to ensure that the local subdivision of triangular cells does not impact the true triangle conformance of the mesh, i.e. all the resulting cells in the mesh after subdivision remain triangular.

At 86, neighboring triangles of the subdivided triangles are identified. The neighboring triangles are subdivided, at 88. In this manner, iterative local subdivision of an identified subset of triangular mesh cells is performed to ensure that the resolution of mesh in the user-edited region of the diagnostic image is such that the editing does not impact the ROI boundaries, i.e. the segmentation results on the adjacent image planes. At 90, a determination is made regarding whether the subdivision of the identified triangles is satisfactory (i.e., above a predetermined threshold). In one embodiment, the mesh triangles of interest are subdivided until each triangle vertex corresponds to a single image pixel or voxel in the diagnostic image. If not satisfactory, then the method reverts to 82 for continued iteration. If the granularity of the subdivided triangles is satisfactorily fine, then at 92 the mesh is further edited using the FLC algorithm until the user is satisfied with the editing.

In one embodiment, a stopping criterion for the iterative local subdivision based on triangular cell edge length and image slice spacing in the viewed image volume orientation (axial, coronal, sagital or oblique) is provided, whereby subdivision is stopped when sub-triangles reach a size such that each sub-triangle corresponds to or contains a single image pixel. Deformation of a subset of mesh vertices is performed such that the new ROI contours on the edited image plane match with the user desired correction.

In another embodiment, the method provides for selective subdivision of a subset of identified mesh triangles by the FLC algorithm, which is carried out iteratively until the resolution of the selected mesh triangles is less than or equal to the image slice spacing in the viewed image orientation. This feature ensures that the displacement of mesh vertices does not affect the ROI contour on adjacent image slices, since the triangular edges of the subdivided triangles do not span across multiple slices.

Figure 5A:
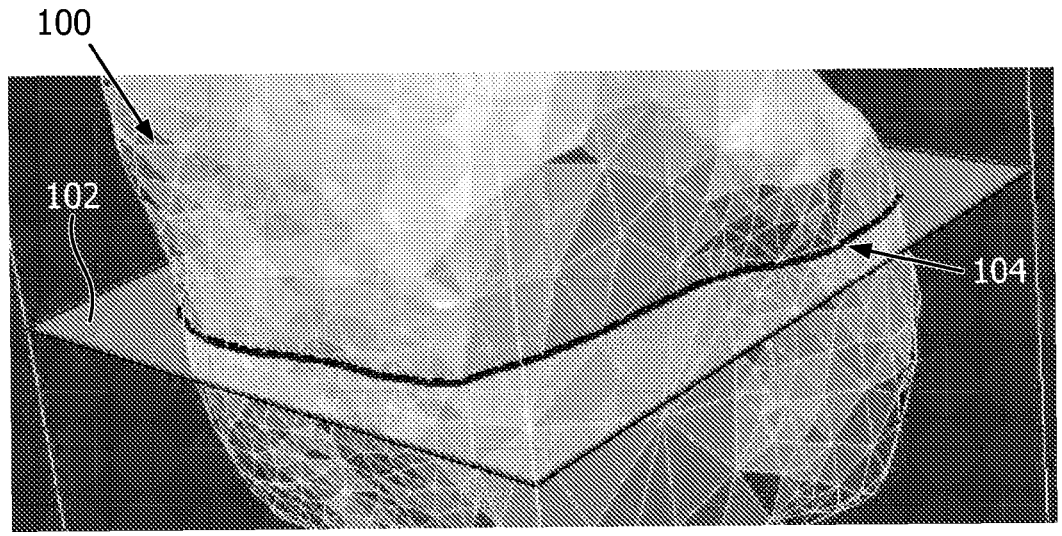

FIG. 5A illustrates the segmentation/contouring results for a 2-D image slice view. A region of interest (ROI) mesh 100 is shown with a viewed image plane 102 passing there through. An ROI contour 104 is obtained by the intersection of ROI's triangular surface mesh representation with the viewed image plane. The ROI contour is an ordered set of intersection points obtained from a line-plane intersection equation. The ROI contour 104 represents the triangular edges of the mesh 100 which intersect with the image plane 102.

Figure 5B:
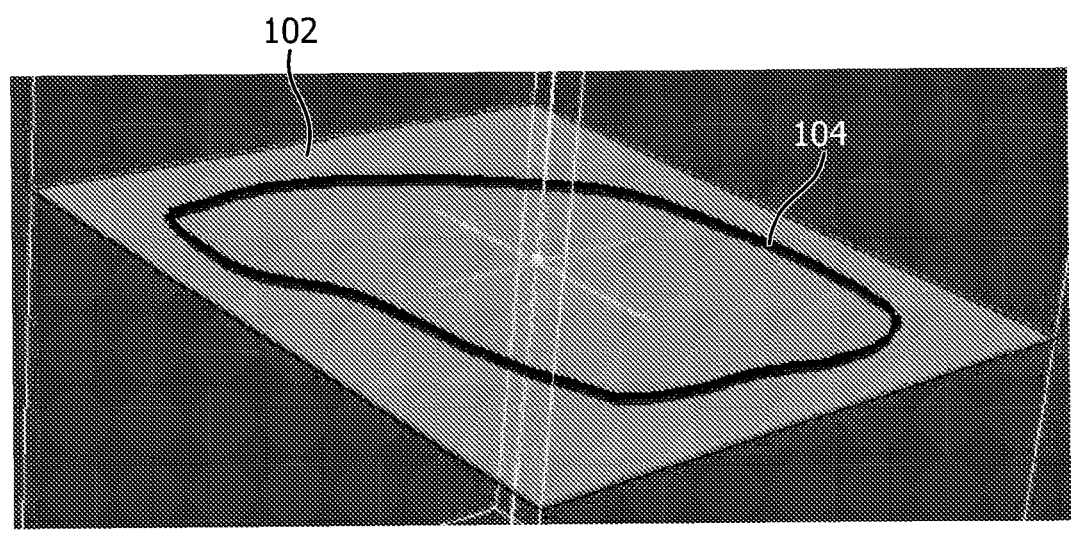
FIG. 5B illustrates the ROI contour along the entire intersection of the mesh (not shown) with the image plane.

FIG. 5B illustrates the ROI contour 104 along the entire intersection of the mesh (not shown) with the image plane 102. It is this contour that the user will edit.

Figure 6:
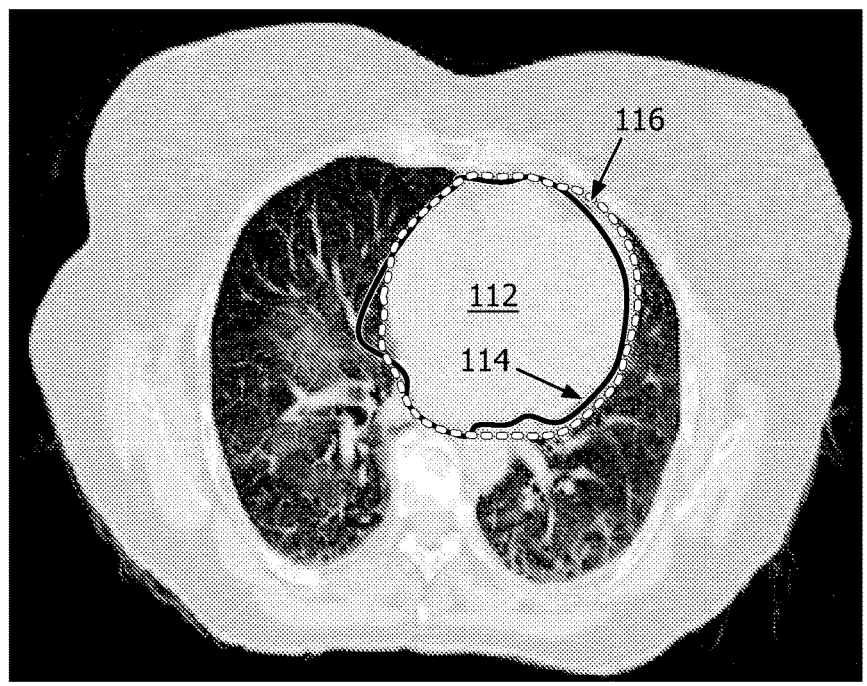
FIG. 6 illustrates a top-down thoracic CT image that has been segmented. In order to correct an ROI boundary about an ROI, the user draws a free hand curve.

FIG. 6 illustrates a top-down thoracic CT slice or plane image 110 that has been segmented. In order to correct an ROI boundary about an ROI 112, the user draws a free hand curve. The solid contour line 114 represents the automatic segmentation result and the dashed contour line 116 represents the free hand editing input of the user or desired location of the ROI contour. Alternatively, a user uses a virtual pull or push segmentation tool to move the automatic segmentation line or the freehand line closer to the segmented surface or interface. Each point on the ROI contour corresponds to a pair of upper and lower mesh vertex representing a triangular edge that intersects with the image plane. In order to achieve the user-desired ROI boundary 116, these triangular edges are adjusted or moved parallel to the viewed image plane in such a way that the new mesh intersection curve with the viewed image plane results in the user-specified ROI boundary 116. Therefore, edge adjustment can be viewed as a two step process that 1) identifies a mechanism to snap the existing ROI contour 114 onto the viewed image plane to the user-specified ROI boundary 116 (a 2-D problem), and 2) displaces the pair of mesh vertices corresponding to the new positions of ROI contour points (displacement is parallel to the viewed image plane).

Figure 7:
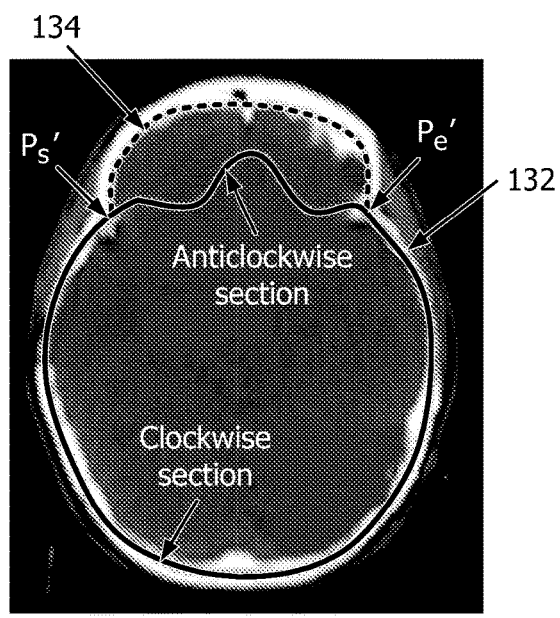
FIG. 7 illustrates a top-down cranial CT image, in which a fuzzy line change (FLC) technique used to identify the subset of mesh vertices and snap them to a user-drawn contour is employed.

FIG. 7 illustrates a top-down cranial CT image 130, in which a fuzzy line change (FLC) technique used to identify the subset of mesh vertices and snap them to a user-drawn contour is employed. The technique is based on shortest distance and curvature metrics. The nearest points on the ROI contour 132 from the end points of the user drawn curve 134 are termed as the start point $p_s{}'$ and the end point $p_e{}'$. The start and end points divide the ROI contour into two sections, clockwise and anticlockwise section, respectively as shown in FIG. 7. A set of parameters (e.g., vicinity, average distance, shortest distance, perimeter, etc.) are computed for both clockwise and anticlockwise sections of the ROI contour with respect to the user drawn curve. A weighted sum of these parameters decides which section of the ROI contour (clockwise or anticlockwise) is to be snapped to the user drawn curve. In the example of FIG. 7, the anticlockwise section would be snapped to the user-drawn contour 134. The subset of mesh vertices and the associated mesh triangular cells corresponding to the snapping section of the ROI contour are displaced to achieve the desired editing result.

Figure 8:
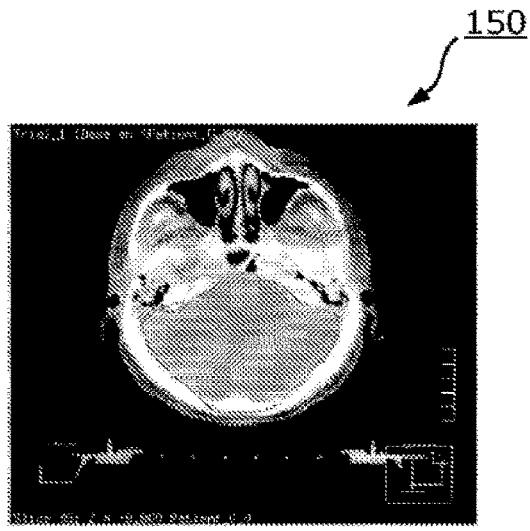
FIG. 8 shows a diagnostic image with an automated segmentation contour and a user-drawn contour line.

FIG. 8 shows a diagnostic image 150 with an automated segmentation contour 152 (solid) and a user-drawn contour line 154 (dashed line). The user-drawn line 154 is used to correct the segmentation of the region of interest in the image. However, since mesh resolution is limited when compared to the image volume resolution of CT datasets in radiation therapy planning, mesh editing produces undesired results on adjacent image planes as shown in FIGS. 9A-C and 10A-C.

Figure 9A:
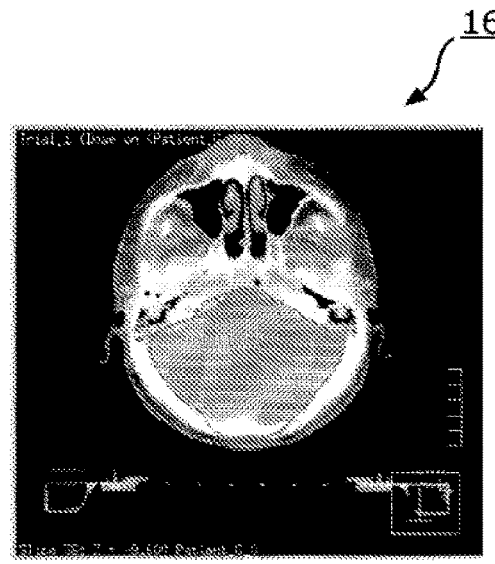
FIGS. 9A-9C show several slices of the diagnostic image.
Figure 9B:
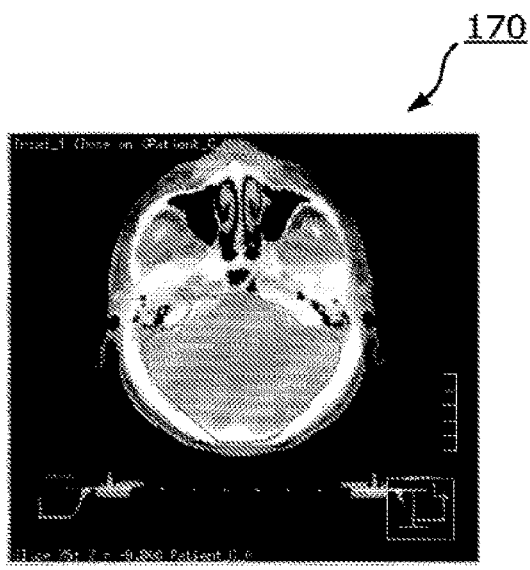
Figure 9C:
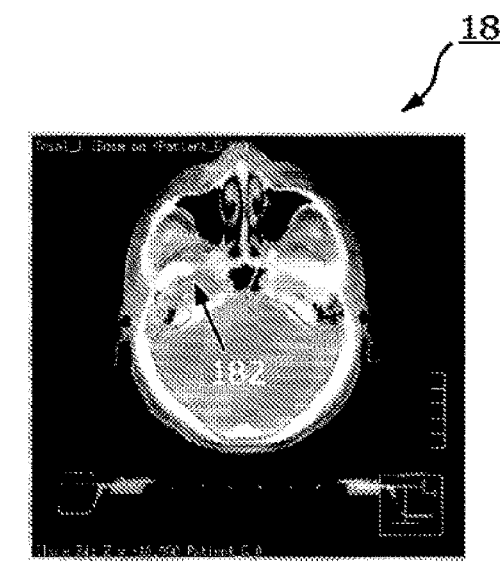

FIGS. 9A-C show several slices of the diagnostic image of FIG. 8. FIG. 9A shows slice N−1 160, an image slice immediately preceding a current slice, before editing. FIG. 9B shows the current slice N 170 before editing. Slice N is the viewed image plane. FIG. 9C shows slice N+1 180, an image slice immediately following the viewed image slice N. Slice N+1 includes a protrusion 182 that includes tissue that is not part of the ROI.

FIGS. 10A-C respectively show the three post-editing slices N−1 190, N 200, and N+1 210 after editing of the image slice N using a mesh editing technique. It will be noted that the editing of slice N has caused a change in slice N+1, such that the protrusion 182 (FIG. 9C) is no longer present.

FIGS. 11A and 11B illustrate an example of an edited mesh 220, wherein the deformation of mesh vertices results in long triangular edges which modify the shape of ROI contour on the adjacent image planes. In FIG. 11A, the mesh is shown before editing. In FIG. 11B, the mesh 220 is shown after editing, wherein the shape of the edited ROI contour has been distorted or deformed, as shown by the elongated or stretched triangles 222.

FIG. 12 illustrates several scenarios in which mesh triangles are subdivided. Selective subdivision of mesh triangles is not a trivial problem. The subdivision is not permitted to affect the triangular conformance of the mesh, i.e. mesh cells are constrained to remain triangular. The triangles shaded in light grey are to be subdivided, and the un-shaded triangles are adjacent triangles. The subdivision algorithm ensures that the new mesh cells resulting after subdivision remain triangular for both the subdivided triangle cells and the adjacent triangle cells. At the same time, the edge length for the subdivided triangles is reduced after each subdivision.

FIG. 13 shows the result of selective subdivision for a subset of triangular mesh cells. In FIG. 13, an original mesh model 240 is shown, with a subsection 242 thereof selected. After selective subdivision, the subsection 242 includes a plurality of subdivided mesh triangles 244.

FIG. 14A-C respectively show frames N−1, N, and N+1 after editing using the herein-described in-plane mesh editing technique, in which selected mesh triangles are subdivided while neighboring or adjacent mesh triangles are left unaffected. User-desired editing is achieved on the viewed image plane N in FIG. 14B while the ROI contours on the adjacent image planes remain intact, in FIGS. 14A and 14C.

For instance, the protrusion 182 is not affected in slice N+1, as it was when using the mesh editing technique described with regard to FIG. 10C.

It will be appreciated that the herein-described techniques can be used for triangular mesh-based ROI editing in any suitable applications; both for 3D editing use cases and in-plane 2D editing use cases. The described selective subdivision provides a flexible and computationally efficient way of performing in-plane editing. It can also be useful in refining local resolution (e.g., of a subsection of mesh) for better representation of high detail areas in a coarse 3D triangular surface mesh model of a ROI.

FIG. 15 illustrates a system 300 that facilitates reversibly and deformation of a 3D surface mesh as well as surface mesh triangle subdivision that increases mesh resolution, in accordance with various aspects described herein. The system includes a user interface 302 that is coupled to one or both of a nuclear imager 304, such as a positron emission tomography (PET) imager or a single-photon emission computed tomography (SPECT) imager, ultrasound, and a magnetic resonance imaging (MRI) device 306 that generate image data for segmentation using the described techniques. In one embodiment, the user interface is coupled to an X-ray device or CT scanner 307 that generates image data for segmentation using the described techniques. The image can also be retrieved from a memory, an image-combining processor that combines images from two or more modalities, or the like. However, it will be appreciated that the described systems and methods are applicable to other imaging modalities.

The user interface includes a processor 308 that executes, and a memory 310 that stores, computer-executable instructions for carrying out the various methods, techniques, etc., described herein to invertibly deform a surface mesh for a region of interest in a diagnostic image, as well as locally increasing mesh resolution by selectively subdividing surface mesh triangles. For instance, the memory may be volatile or non-volatile memory, flash memory, random access memory (RAM), read-only memory (ROM), programmable read-only memory (PROM), erasable programmable read-only memory (EPROM), electronically erasable programmable read-only memory (EEPROM), a combination of one or more of the foregoing, or any other data storage medium suitable for carrying out the various actions and methods described herein. The user interface additionally includes a display 312 on which images, anatomical models, and the like are presented to a user, and a user input device 314 (e.g., a keyboard, mouse, stylus, track ball, graphical user interface, or other suitable input device) through which the user enters commands to select one or more anatomical models or images, to manipulate one or more models to conform to an image, etc.

For instance, the memory 310 stores image data 316 generated by one or more of the imagers 304, 306, 307. The memory additionally stores one or more pre-generated surface mesh models 318 for various organs and anatomical structures. A tool kit 326 is stored in the memory and includes virtual tools that permits a user to manipulate (e.g., push, pull, etc.) one or more surface models or contours thereof during segmentation using one or more segmentation algorithms 328. In one embodiment, several models are adapted simultaneously.

The memory stores a Gaussian kernel adjustment (GKA) algorithm or module 330 that adjusts the size of a Gaussian kernel used to deform a mesh model contour as a function of a magnitude of mouse or other input device movement by a user, as described with regard to FIGS. 1-3. Additionally, the memory stores a fuzzy line change (FLC) algorithm 332 that is executed by the processor to snap or adjust mesh model contours to a user-drawn contour, as described with regard to FIGS. 4-14.

The system 300 permits 3D manipulation of a contoured image volume model, which in turn permits a user to manipulate contours of an image volume model in one plane at a time, rather than in multiple planes, if desired. For instance, a user accesses the virtual tool kit 326 and uses its electronically-defined tools to push, pull, or otherwise adjust the model contour in two or three dimensions. Alternatively, the user simply draws a line or curve (e.g., a contour) on the mesh model. For example, the virtual tools define surfaces of various radii, shapes, and sizes, including a single point, that can press or pull the contour to mold its shape to the user-drawn contour. The user can push or pull the tool along the displayed plane or at an angle to the displayed plane.

With reference to FIG. 16, an exemplary hospital system 400 may include a plurality of imaging devices 401, such as CT, MRI, PET, SPECT, variants of the foregoing, or the like, which generate imaging data that are reconstructed by individual or shared reconstruction processors 402 to generate 3D image representations. The image representations are communicated over a network 404 to a central memory 406.

At a station 410 connected with the network, the user interface 302 includes the processor 308, the memory 310, the display 312, and the user input device 314, as described with regard to FIG. 15. Additionally, it will be appreciated that the memory 310 includes the various data and algorithms (computer-executable instructions) described with regard to FIG. 15.

An operator uses the input device 314 to move a selected 3D patient image representation from the central memory to a local memory 412. Pre-generated reference mesh models corresponding to the selected 3D patient image representation also may be imported from an atlas of models (not shown), stored the central memory or at the station 410, to the local memory, and are selected to approximately match the selected patient image volume(s) either automatically or manually. A video processor 414 overlays the reference models on the patient image representation and displays the reference models and the patient image representation with overlaid landmarks on the display 312. The operator uses the input device to manipulate one or more contours on the mesh model. In one embodiment, the display 312 includes a plurality of viewports 418.

For instance, a patient image may be displayed in a first viewport 418a, and a selected model corresponding to a volume of interest (e.g., an anatomical structure, tumor, etc.) is displayed in a second viewport 418b. A third viewport 418c presents the patient image with the selected model overlaid thereon to the operator. In another embodiment, three orthogonal views (and optionally a perspective view) of the patient image with the overlaid model are displayed. The operator, through the input device 314, employs virtual tools to manipulate (e.g., push, pull, redraw, etc.) contours of the model to conform the model to the patient image. This procedure is iterated for all models and all structures of interest in the patient image.

In another embodiment, to conform the reference model to the shape of one or more of the anatomical structures in the patient image, the operator uses the input device to redraw or adjust one or more portions of a contour in the reference mesh model. Once the operator has repositioned the contour or boundary at a desired location on the patient image volume, the operator "approves" the repositioned boundary or contour, which triggers updating of the mesh model contour. The process of user approval and mesh model updating is iteratively repeated until the user is satisfied that the reference model segmentation sufficiently conforms to the patient image volume. The user may then indicate approval of the entire model segmentation on the patient image volume.

The user-approved models can be stored in the central memory 406, the local memory 412, or used directly in another process. For instance, a therapy planning (e.g., radiation, ablation, etc.) station 430 can use the approved patient models to plan a therapy session. Once planned to the satisfaction of the operator, the planned therapy is transferred to a therapy device 432 that implements the planned session. Other stations may use the shaped contours, models, etc., in various other planning processes.

The innovation has been described with reference to several embodiments. Modifications and alterations may occur to others upon reading and understanding the preceding detailed description. It is intended that the innovation be construed as including all such modifications and alterations insofar as they come within the scope of the appended claims or the equivalents thereof.

Having thus described the preferred embodiments, the invention is now claimed to be:

1. A method of invertibly deforming a diagnostic image surface mesh by automatically adjusting a radius of curvature of a deformation kernel, including:
   receiving user input regarding a start point $p_s$ for a contour to be deformed on a surface mesh overlaid on a diagnostic image; and
   adjusting a curvature of deformation to a distance between the start point $p_s$ and an end point $p_e$, such that the curvature of deformation is adjusted in accordance with the distance between the start point $p_s$ and the end point $p_e$;
   wherein the start point $p_s$ and the end point $p_e$ are located on the contour to be deformed;
   wherein the curvature is defines by a radius, r, where:

$$r = \lambda \|p_s - p_e\|,$$

where $$\lambda > \sqrt{2} \cdot \exp(-0.5) \approx 0.86,$$

where $\lambda$ is a fixed scalar ratio.

2. The method according to claim 1, wherein the curvature is defined by a Gaussian deformation kernel.

3. The method according to claim 1, wherein to define the contour, a user selects a first point that is identified as the start point $p_s$ using an input device, drags a cursor to push or pull the contour to be deformed, and releases the cursor at a second point, which is identified as the end point $p_e$.

4. A processor or non-transitory computer-readable medium programmed to perform the method of claim 1.

5. A system that facilitates invertibly deforming a diagnostic image segmentation surface mesh by automatically adjusting a radius of curvature of a deformation kernel, including:
   a display on which is presented to a user a diagnostic image with a segmentation surface mesh overlaid thereon;
   a user input device via which a user inputs a start point $p_s$ for a contour on the surface mesh to be deformed; and
   a processor that:

adjusts a curvature of deformation to a distance between the start point $P_s$ and an end point $p_e$, such that the curvature of deformation of the contour is adjusted in accordance with the distance between the start point $p_s$ and the end point $p_e$;

wherein the start point $p_s$ and the end point $p_e$ are located on the contour to be deformed;

wherein the curvature is defines by a radius, r, where:

$$r=\lambda\|p_s-p_e\|,$$

where $$\lambda > \sqrt{2} \cdot \exp(-0.5) \approx 0.86,$$

where $\lambda$ is a fixed scalar ratio.

6. The system according to claim 5, wherein the curvature is defined by a Gaussian deformation kernel.

7. The system according to claim 5, wherein to define the contour, the user selects a first point that is identified as the start point $p_s$ using the input device, drags a cursor to push or pull the contour to be deformed, and releases the cursor at a second point, which is identified as the end point $p_e$.

* * * * *